(12) United States Patent
Parthasarathy et al.

(10) Patent No.: US 11,280,413 B2
(45) Date of Patent: Mar. 22, 2022

(54) CHOKE VALVE HAVING GATE BODY WITH MULTIPLE METERING SEGMENTS

(71) Applicant: ADS SERVICES LLC, Midland, TX (US)

(72) Inventors: Anand Parthasarathy, Cypress, TX (US); Scott Charles, Houston, TX (US)

(73) Assignee: ADS SERVICES LLC, Midland, TX (US)

( * ) Notice: Subject to any disclaimer, the term of this patent is extended or adjusted under 35 U.S.C. 154(b) by 0 days.

(21) Appl. No.: 16/839,660

(22) Filed: Apr. 3, 2020

(65) Prior Publication Data

US 2020/0318746 A1 Oct. 8, 2020

Related U.S. Application Data

(60) Provisional application No. 62/829,113, filed on Apr. 4, 2019.

(51) Int. Cl.
| | |
|---|---|
| *F16K 3/34* | (2006.01) |
| *F16K 3/24* | (2006.01) |
| *F16K 3/314* | (2006.01) |
| *E21B 21/08* | (2006.01) |
| *E21B 21/10* | (2006.01) |
| *F16K 1/54* | (2006.01) |

(Continued)

(52) U.S. Cl.
CPC .................. *F16K 3/34* (2013.01); *F16K 3/24* (2013.01); *F16K 3/314* (2013.01); *E21B 21/08* (2013.01); *E21B 21/106* (2013.01); *E21B 34/025* (2020.05); *F16K 1/385* (2013.01); *F16K 1/54* (2013.01)

(58) Field of Classification Search
CPC ... F16K 3/34; F16K 3/24; F16K 3/314; F16K 1/385; F16K 1/54; E21B 21/08; E21B 21/106; E21B 34/025
USPC .......................................... 251/324, 120–122
See application file for complete search history.

(56) References Cited

U.S. PATENT DOCUMENTS

| | | | | |
|---|---|---|---|---|
| 3,059,894 A | * | 10/1962 | Knecht | ...................... F16K 1/34 |
| | | | | 251/121 |
| 3,441,249 A | * | 4/1969 | Wilfred | ................... F16K 47/10 |
| | | | | 251/333 |

(Continued)

FOREIGN PATENT DOCUMENTS

| | | |
|---|---|---|
| EP | 0060842 B1 | 4/1987 |
| GB | 2265966 B | 8/1995 |

OTHER PUBLICATIONS

International Search Report for PCT/US20/26599 dated Jun. 29, 2020.

*Primary Examiner* — John Bastianelli

(57) ABSTRACT

A choke valve is provided having a body, a seat, and a gate. The body has an internal chamber, an inlet flow passage, and an outlet flow passage. The seat has a seat orifice with an area, the seat positioned at an end of the outlet flow passage contiguous with the internal chamber. The gate has a gate shaft and a gate body affixed to one end of the gate shaft. The gate is linearly translatable within the body between a fully open position and a fully closed position, wherein in the fully closed position the gate body is engaged with the seat orifice. In the fully open position a choke minimum passage area is defined between the gate body and the seat orifice, and the choke minimum passage area is at least 30% of the seat orifice area.

17 Claims, 7 Drawing Sheets

(51) Int. Cl.
  *E21B 34/02* (2006.01)
  *F16K 1/38* (2006.01)

(56) References Cited

U.S. PATENT DOCUMENTS

| | | | | |
|---|---|---|---|---|
| 3,908,698 A | * | 9/1975 | Baumann | F16K 47/08 |
| | | | | 137/625.3 |
| 4,047,695 A | * | 9/1977 | Cleveland | E21B 34/02 |
| | | | | 251/122 |
| 4,337,788 A | * | 7/1982 | Seger | E21B 34/02 |
| | | | | 137/315.02 |
| 4,356,997 A | * | 11/1982 | Beffano | E21B 34/02 |
| | | | | 138/44 |
| 4,493,336 A | | 1/1985 | Renfro | |
| 4,549,718 A | * | 10/1985 | Seger | F16K 47/04 |
| | | | | 251/121 |
| 8,038,121 B2 | * | 10/2011 | Gessaman | F16K 39/022 |
| | | | | 251/122 |
| 2017/0315566 A1 | | 11/2017 | Martino | |
| 2018/0313458 A1 | | 11/2018 | Parthasarathy | |
| 2019/0032807 A1 | | 1/2019 | Long | |

* cited by examiner

CHOKE VALVE HAVING GATE BODY WITH MULTIPLE METERING SEGMENTS

This application claims priority to U.S. Patent Appln. No. 62/829,113 filed Apr. 4, 2019, which is herein incorporated by reference in its entirety.

BACKGROUND OF THE INVENTION

1. Technical Field

The present disclosure relates to choke valves for well drilling applications in general, and choke valve gate and seat operation in particular.

2. Background Information

Subterranean wells (subsea or land based) are typically created by drilling a hole into the earth with a drilling rig that rotates a drill string that includes a hollow drill pipe and a drill bit attached to an end of the drill pipe. After the hole is drilled, casing sections are inserted into the hole to provide structural integrity to the newly drilled wellbore, and in some instances to isolate potentially dangerous high pressure zones from each other and from the surface. This process may be repeated several times (e.g., two to five times) at increasingly smaller bore diameters to create a well at a desired depth.

The drill bit is configured to cut into whatever material (e.g., rock) is encountered during the drilling process. To facilitate the drilling process, a drilling fluid (often referred to as "mud") is typically pumped down the inside of the drill pipe and exits at the drill bit. The drilling fluid may be a fluid, or may be a mixture of fluids, solids and chemicals that is tailored to provide the correct physical and chemical characteristics required to safely drill the well; e.g., cool the drill bit, lift cuttings to the surface, prevent destabilization of the rock in the wellbore walls, overcome the pressure of fluids inside the rock so that these fluids do not enter the wellbore, etc. The debris (often referred to as "cuttings") generated by the drilling process is swept up by the drilling fluid as it circulates back to surface outside the drill pipe. The drilling fluid and debris is subsequently processed to separate the cuttings and return the circulating drilling fluid to the drilling process. A pumping system (typically referred to as a "mud pump") is typically used to circulate the drilling fluid.

During the drilling process, the fluids located at the bottom of the well are said to be at a "bottom hole" pressure ($P_{BH}$), which pressure is a function of the hydrostatic pressure within the well and may also be a function of annular friction pressure during a dynamic condition. For a variety of reasons, it is desirable to maintain a substantially constant $P_{BH}$ that is higher than the fluid pressure in the local formation (i.e., the formation pressure). During the drilling process, however, the drilling may encounter a well region that contain fluids (e.g., oil and gas) at a relatively elevated high pressure (i.e., a formation pressure that is higher than the $P_{BH}$). The elevated formation pressure is typically referred to as a "kick", and if the kick is great enough and unchecked could lead to a "blowout".

Some wells utilize a "managed pressure drilling" (MPD) system during the normal course of drilling that is configured to maintain a substantially constant $P_{BH}$ during drilling. MPD is a technology for controlling the annular fluid pressure within the well during drilling. In MPD controlled wells, the annular fluid pressure (e.g., the BHP) is typically defined as the sum of hydrostatic pressure ("$P_H$"), the annulus frictional pressure ("$P_A$"), and the back pressure ("$P_{BP}$"); (i.e., BHP=$P_H$+$P_A$+$P_{BP}$). Similar to conventional drilling practices, MPD is designed to control the well pressure between the pore pressure and the fracture pressure (i.e., $P_P$<BHP<$P_F$). By manipulating topside located chokes and pumps, MPD provides an improved means (relative to conventional drilling control techniques) of establishing well pressure and counteracting pressure disturbances that may occur.

The ability to quickly respond to a pressure variation in BHP is a key aspect of any MPD system. In many prior art MPD systems, one or more control valves (sometimes referred to as a "choke" or a "choke valve") are utilized as an element to control pressure. Some choke valves are fixed orifice and others are variable orifice. A variable orifice choke valve (i.e., an adjustable choke valve) may be actuated in a continuum of different states, from a fully open state (100% open) to a fully closed state (0% open), and a plurality of open states there between (e.g., 10% open, 20% open, 30% open, etc.). More specifically, a variable orifice choke valve typically includes a stationary member (e.g., a seat) and a translating member (a gate), which collectively may be referred to as a "trim set". Movement of the translating member relative to the stationary member varies the state of the choke (% open), either closing the choke or opening the choke.

Choke valves are typically defined in terms of the parameters of the fluid flow passing through the choke. The relationship between the volumetric fluid flow rate ("Q") through a choke valve, a difference in pressure across the choke valve ("ΔP"), and the specific gravity ("SG") of the fluid passing through the choke valve may be identified in terms of a flow coefficient ("Cv") for example by the following equation:

$$C_v = Q\sqrt{\frac{SG}{\Delta P}} \qquad \text{Eqn. 1}$$

The volumetric fluid flow ("Q") through the choke valve, the difference in pressure across the choke valve ("ΔP"), and the specific gravity ("SG") of the fluid flowing through the choke valve may be viewed as operational parameters; i.e., parameters dictated by the end use application of the choke. The flow coefficient Cv of the choke valve, on the other hand, may be viewed as a characteristic of the choke valve that may vary as a function of the other parameters. The volumetric fluid flow rate ("Q") through the choke valve (as considered within this Eqn. 1) refers to the zero to one hundred percent (0-100%) fluid flow. The relationship between the flow coefficient Cv of a choke valve and the valve opening percentage (i.e., choke position) of the same choke valve is typically unique to that particular model choke valve. FIG. 1 illustrates a graph having a single trim flow curve (sometimes referred to as a "Cv curve") with Cv values on a Y-axis and valve percent open on the X-axis. Hence, a choke valve may be characterized by the flow coefficient (Cv) curve, and the Cv curve is defined by data intersection points in a graph having Cv values along a Y axis and choke open percentage values along an X axis.

SUMMARY

According to an aspect of the present disclosure, a choke valve is provided that includes a body, a seat, and a gate. The body has an internal chamber, an inlet flow passage that extends between an exterior of the body and the internal chamber, and an outlet flow passage that extends between the exterior of the body and the internal chamber. The seat has a seat orifice with an area, the seat positioned at an end of the outlet flow passage contiguous with the internal chamber. The gate has a gate shaft and a gate body affixed to one end of the gate shaft, wherein the gate is linearly translatable within the body between a fully open position and a fully closed position, wherein in the fully closed position the gate body is engaged with the seat orifice. In the fully open position, a choke minimum passage area is defined between the gate body and the seat orifice, and the choke minimum passage area is at least 30% of the seat orifice area.

In any of the aspects or embodiments described above and herein, in the fully open position, the choke minimum passage area may be at least 60% of the seat orifice area.

In any of the aspects or embodiments described above and herein, in the fully open position, the choke minimum passage area may be 100% of the seat orifice area.

In any of the aspects or embodiments described above and herein, the seat orifice has an inner diameter, and the gate body includes a metering segment having an outer diameter. The metering segment outer diameter is less than the seat orifice inner diameter, and the metering segment is configured to be received within the seat orifice when the gate body is engaged with the seat orifice.

In any of the aspects or embodiments described above and herein, the gate body may include a first seal surface disposed adjacent the metering segment, and the seat may include a second seal surface disposed at an axial end of the seat orifice. The first seal surface and the second seal surface may be configured to engage with one another when the gate is in the fully closed position, and to substantially prevent the passage of liquid into or out of the seat orifice.

In any of the aspects or embodiments described above and herein, the gate body may include a first axial end and an opposite second axial end, and the gate shaft may extend outwardly from the first axial end and the metering segment may extend between the second axial end and the first seal surface, and the first seal surface may be disposed between the first axial end and the second axial end.

In any of the aspects or embodiments described above and herein, the seat orifice has an inner diameter, and the gate body may include a first metering segment having a first outer diameter, and a second metering segment having a second outer diameter. The first outer diameter is greater than the second outer diameter, and the first outer diameter is less than the seat orifice inner diameter, and the first metering segment and the second metering segment are configured to be received within the seat orifice when the gate body is engaged with the seat orifice.

In any of the aspects or embodiments described above and herein, the gate body may include a first seal surface disposed adjacent the first metering segment, and the gate body may include a second seal surface disposed at a first end of the seat orifice. The first seal surface and the second seal surface are configured to engage with one another when the gate is in the fully closed position, and to substantially prevent the passage of liquid into or out of the seat orifice.

In any of the aspects or embodiments described above and herein, the gate body may include a first axial end and an opposite second axial end, and the gate shaft may extend outwardly from the first axial end and the second metering segment may extend axially between the second axial end and first metering segment, and the first metering segment may extend axially between the second metering segment and the first seal surface, and the first seal surface may be disposed between the first axial end and the first metering segment.

In any of the aspects or embodiments described above and herein, the gate body and the seat are positionable in a partially engaged configuration wherein the second metering segment is at least partially received within the seat orifice, the first metering segment is axially disposed outside of the seat orifice, the first seal surface and the second seal surface are separated from one another, and an annular passage is formed between the second metering segment and the seat orifice.

According to another aspect of the present disclosure, a choke valve system is provided having a choke valve, a worm gear drive, and a motor. The choke valve includes a body, a seat, and a gate. The body has an internal chamber, an inlet flow passage that extends between an exterior of the body and the internal chamber, and an outlet flow passage that extends between the exterior of the body and the internal chamber. The seat has a seat orifice with an area, the seat positioned at an end of the outlet flow passage contiguous with the internal chamber. The gate has a gate shaft and a gate body affixed to one end of the gate shaft, wherein the gate is linearly translatable within the body between a fully open position and a fully closed position, wherein in the fully closed position the gate body is engaged with the seat orifice. In the fully open position, a choke minimum passage area is defined between the gate body and the seat orifice, and the choke minimum passage area is at least 30% of the seat orifice area. The worm gear drive has an input shaft and an output shaft, wherein the output shaft is connected to the gate shaft. The motor is configured to selectively drive the worm gear input shaft, and thereby cause linear translation of the gate shaft. The system is configured such that the choke valve may be driven from the fully closed position to the fully open position.

In any of the aspects or embodiments described above and herein, the gate body may include a metering segment having an outer diameter, and a first seal surface disposed adjacent the metering segment. The seat orifice has an inner diameter and a second seal surface disposed at an axial end of the seat orifice. The metering segment outer diameter is less than the seat orifice inner diameter, and the metering segment is configured to be received within the seat orifice when the gate body is engaged with the seat orifice. The first seal surface and the second seal surface are configured to engage with one another when the gate is in the fully closed position, and to substantially prevent the passage of liquid into or out of the seat orifice.

In any of the aspects or embodiments described above and herein, the seat orifice has an inner diameter. The gate body includes a first metering segment having a first outer diameter, and a second metering segment having a second outer diameter, the first outer diameter is greater than the second outer diameter, and the first outer diameter is less than the seat orifice inner diameter, and the first metering segment and the second metering segment are configured to be received within the seat orifice when the gate body is engaged with the seat orifice.

In any of the aspects or embodiments described above and herein, the gate body includes a first seal surface disposed adjacent the first metering segment, and the gate body includes a second seal surface disposed at a first end of the seat orifice. The first seal surface and the second seal surface are configured to engage with one another when the gate is in the fully closed position, and to substantially prevent the passage of liquid into or out of the seat orifice.

In any of the aspects or embodiments described above and herein, the gate body includes a first axial end and an opposite second axial end, and the gate shaft extends outwardly from the first axial end and the second metering segment extends axially between the second axial end and first metering segment, and the first metering segment extends axially between the second metering segment and the first seal surface, and the first seal surface is disposed between the first axial end and the first metering segment. The gate body and the seat are positionable in a partially engaged configuration wherein the second metering segment is at least partially received within the seat orifice, the first metering segment is axially disposed outside of the seat orifice, the first seal surface and the second seal surface are separated from one another, and an annular passage is formed between the second metering segment and the seat orifice.

According to another aspect of the present disclosure, a choke valve is provided that includes a body, a seat, and a gate. The body has an internal chamber, an inlet flow passage that extends between an exterior of the body and the internal chamber, and an outlet flow passage that extends between the exterior of the body and the internal chamber. The seat has a seat orifice with an area and an inner diameter, and the seat is positioned at an end of the outlet flow passage contiguous with the internal chamber. The gate has a gate shaft and a gate body affixed to one end of the gate shaft, wherein the gate is linearly translatable within the body between a fully open position and a fully closed position, wherein in the fully closed position the gate body is engaged with the seat orifice. The gate body includes a first metering segment having a first outer diameter, and a second metering segment having a second outer diameter, the first outer diameter is greater than the second outer diameter, and the first outer diameter is less than the seat orifice inner diameter. In the fully closed position the first metering segment and the second metering segment are received within the seat orifice.

In any of the aspects or embodiments described above and herein, the gate body includes a first seal surface disposed adjacent the first metering segment, and the gate body includes a second seal surface disposed at a first end of the seat orifice. The first seal surface and the second seal surface are configured to engage with one another when the gate is in the fully closed position, and to substantially prevent the passage of liquid into or out of the seat orifice.

In any of the aspects or embodiments described above and herein, the gate body includes a first axial end and an opposite second axial end, and the gate shaft extends outwardly from the first axial end and the second metering segment extends axially between the second axial end and first metering segment, and the first metering segment extends axially between the second metering segment and the first seal surface, and the first seal surface is disposed between the first axial end and the first metering segment.

In any of the aspects or embodiments described above and herein, the gate body and the seat are positionable in a partially engaged configuration wherein the second metering segment is at least partially received within the seat orifice, the first metering segment is axially disposed outside of the seat orifice, the first seal surface and the second seal surface are separated from one another, and an annular passage is formed between the second metering segment and the seat orifice.

In any of the aspects or embodiments described above and herein, the choke valve may be characterized by a flow coefficient (Cv) curve, the Cv curve defined by data intersection points in a graph having Cv values along a Y axis and choke open percentage values along an X axis, and the Cv curve is sloped from an origin of the curve to at least a sixty percent choke open value.

DETAILED DESCRIPTION

Figure 1:
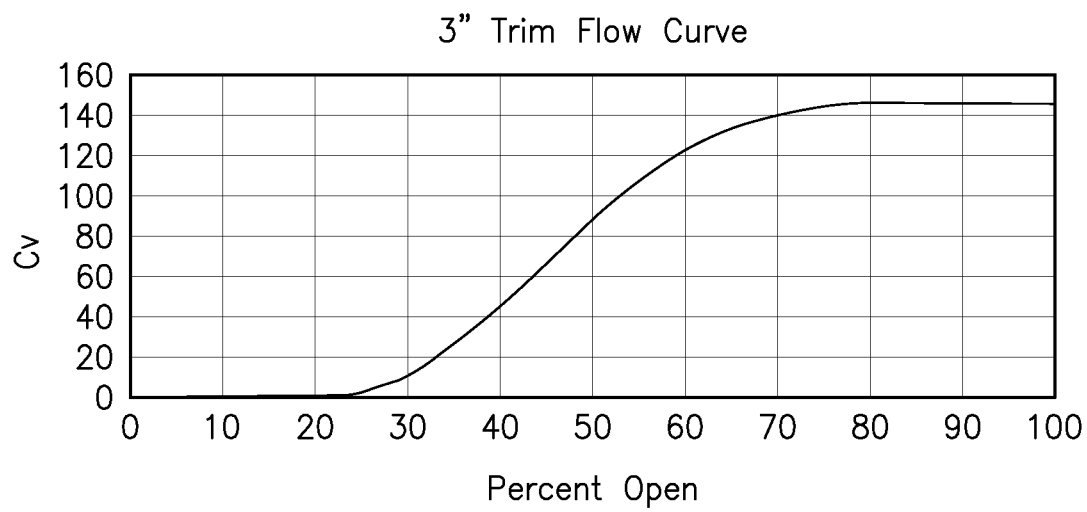
FIG. 1 is an exemplary graph of flow coefficient ("Cv") values versus choke valve open percentage values for a prior art three inch choke valve, which data may be referred to as a "Cv curve".

It is noted that various connections are set forth between elements in the following description and in the drawings (the contents of which are included in this disclosure by way of reference). It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities or a space/gap between the entities that are being coupled to one another.

Figure 2:
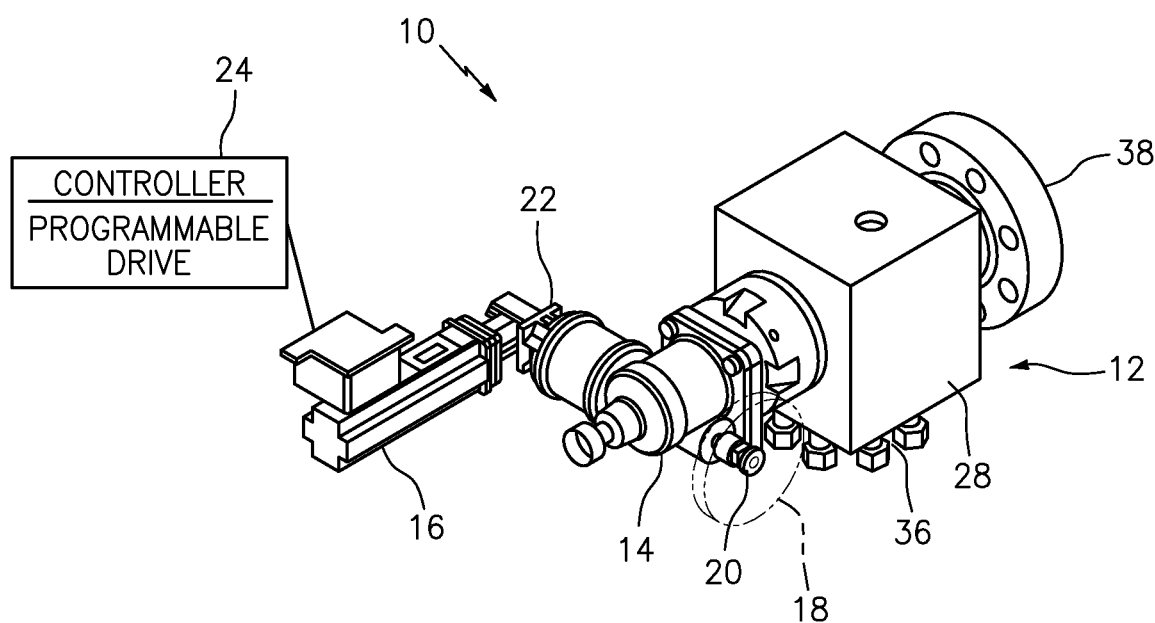
FIG. 2 is a perspective view of a choke valve system.
Figure 3:
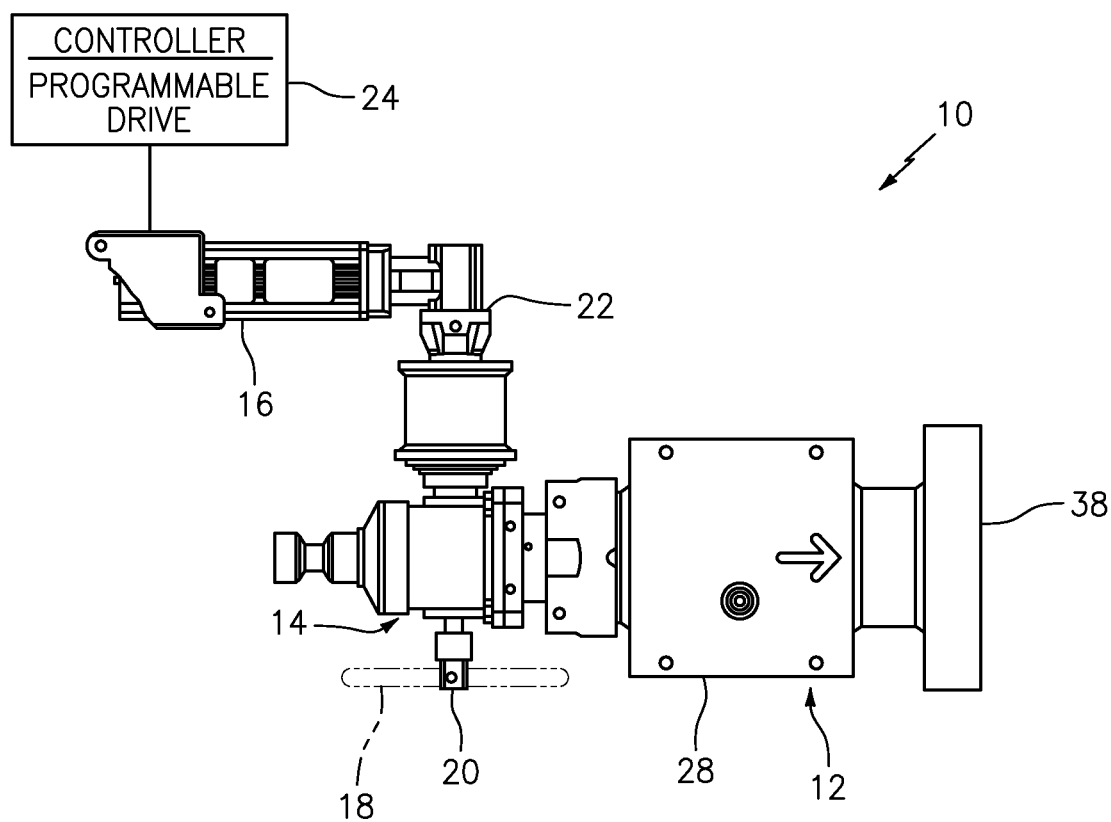
FIG. 3 is a planar view of the choke valve system shown in FIG. 2.

Referring to FIGS. 2 and 3, the present disclosure includes a choke valve system 10 that includes a choke valve 12 and a worm gear drive 14. The choke valve 12 may be a manually actuated valve (e.g., actuable via a hand wheel 30), or the choke valve 12 may be powered by a motor 16, or both. The choke valve system 10 example shown in FIGS. 2 and 3 shows a system 10 that is powered by an electric motor 16 and includes a hand wheel 18 (shown in phantom) for manual operation. For those system embodiments that include a motor 16, the motor 16 may be an electric motor, a hydraulic motor, a pneumatic motor, or the like. The present disclosure is not limited to any particular type of motor 16. The motor 16 maybe coupled to a worm gear input shaft 20 either directly or indirectly via a gearbox 22.

In those embodiments wherein the choke valve 12 is powered by a motor 16, the choke valve system 10 may include a controller (e.g., including a programmable drive 24) configured to control the operation of the motor 16. For example, if the choke valve 12 is powered by an electric motor, the choke valve system 10 may include a programmable drive 24 that includes any type of computing device, computational circuit, or any type of process or processing circuit capable of executing a series of instructions that are stored in memory, including instructions for accomplishing tasks associated with the methodologies described herein. For example, the programmable drive 24 may include multiple processors and/or multicore CPUs and may include any type of processor, such as a microprocessor, digital signal processor, co-processors, a micro-controller, a microcomputer, a central processing unit, a field programmable gate array, a programmable logic device, a state machine, logic circuitry, analog circuitry, digital circuitry, etc., and any combination thereof. The instructions stored in memory may represent one or more algorithms for controlling the choke valve 12, the motor 16, etc., and the stored instructions are not limited to any particular form (e.g., program files, system data, buffers, drivers, utilities, system programs, etc.) provided they can be executed by the programmable drive 24. The memory may be a non-transitory computer readable storage medium configured to store instructions that when executed by one or more processors, cause the one or more processors to perform or cause the performance of certain functions. The memory may be a single memory device or a plurality of memory devices. A memory device may include a storage area network, network attached storage, as well a disk drive, a read-only memory, random access memory, volatile memory, non-volatile memory, static memory, dynamic memory, flash memory, cache memory, and/or any device that stores digital information. One skilled in the art will appreciate, based on a review of this disclosure, that the implementation of the programmable drive 24 may be achieved via the use of hardware, software, firmware, or any combination thereof. The programmable drive 24 may include one or more input devices (e.g., a keyboard, a touch screen, communication input ports, terminals, wireless communication devices, sensors, etc.) and/or one or more output devices (a monitor, data readouts, communication output ports, terminals, wireless communication devices, sensors, etc.) that enable signals and/or communications to be sent to and/or provided from the programmable drive 24.

The choke valve 12 is coupled directly or indirectly to an output shaft 26 of the worm gear drive 14. Rotation of the input shaft 20 of the worm gear drive 14 in a first rotational direction (e.g., clockwise) causes linear translation of the output shaft 26 of the worm gear drive 14 (and choke gate 32 as described below) in a first linear direction. Rotation of the input shaft 20 of the worm gear drive 14 in a second rotational direction (e.g., counter clockwise) causes linear translation of the output shaft 26 of the worm gear drive 14 (and gate 32) in a second linear direction (i.e., opposite the first linear direction). The worm gear drive 14 provides torque multiplication and speed reduction, and also resists back driving of the choke valve 12 in communication with the output shaft 26 of the worm gear drive 14. The gearbox 22 is also configured to provide torque multiplication and speed reduction.

Figure 4A:
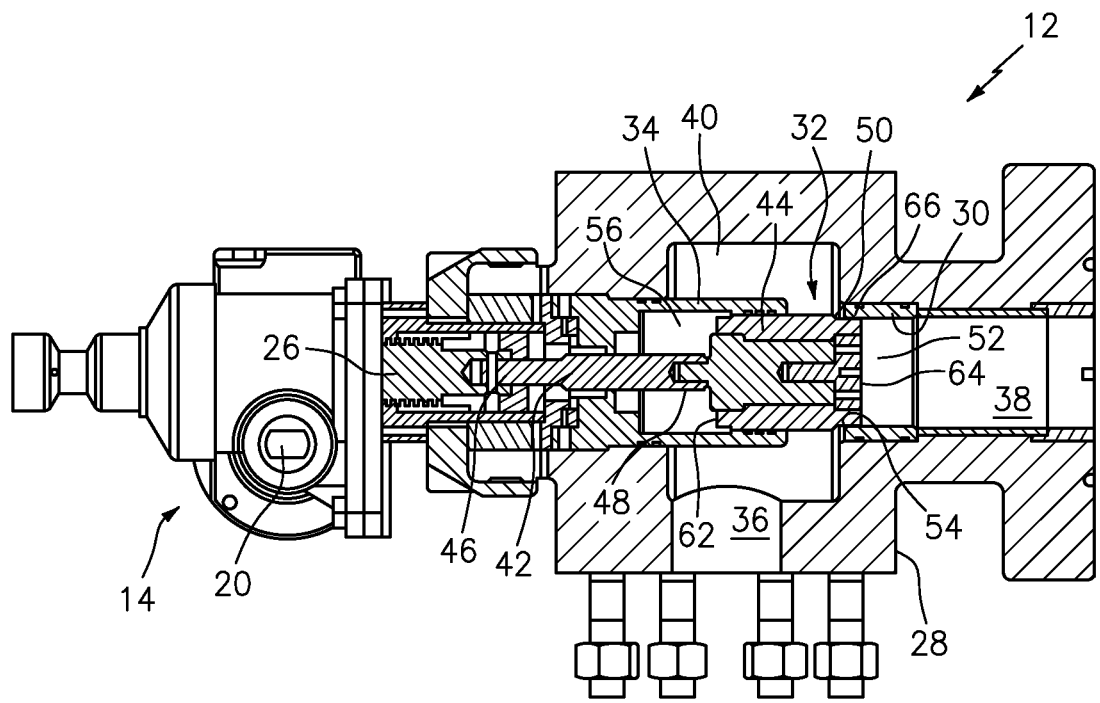
FIG. 4A is a partially sectioned choke valve showing the choke valve in a fully closed position.
Figure 4B:
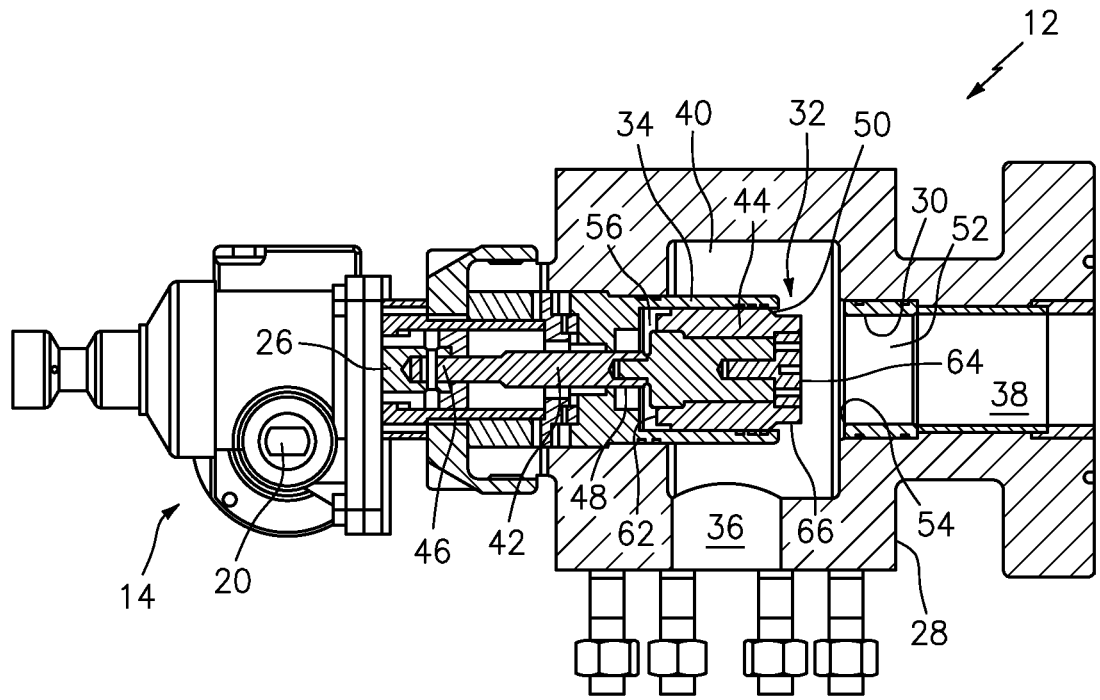
FIG. 4B is the partially sectioned choke valve shown in FIG. 4A, now shown in a fully open position.

Referring to FIGS. 4A and 4B, the choke valve 12 includes a body 28, a seat 30, a linearly translatable gate 32, and a nose 34. The choke body 28 includes an inlet flow passage 36, an outlet flow passage 38, and an internal chamber 40. The inlet flow passage 36 extends from an external surface of the body 28 to the internal chamber 40. The outlet flow passage 38 extends from an external surface of the body 28 to the internal chamber 40. In the embodiment shown in FIGS. 4A and 4B, the external surface having the entry to the inlet flow passage 36 is different from the external surface having the exit of the outlet flow passage 38; e.g., at 90° to one another. The present disclosure is not limited to this choke body 28 configuration.

Figure 7:
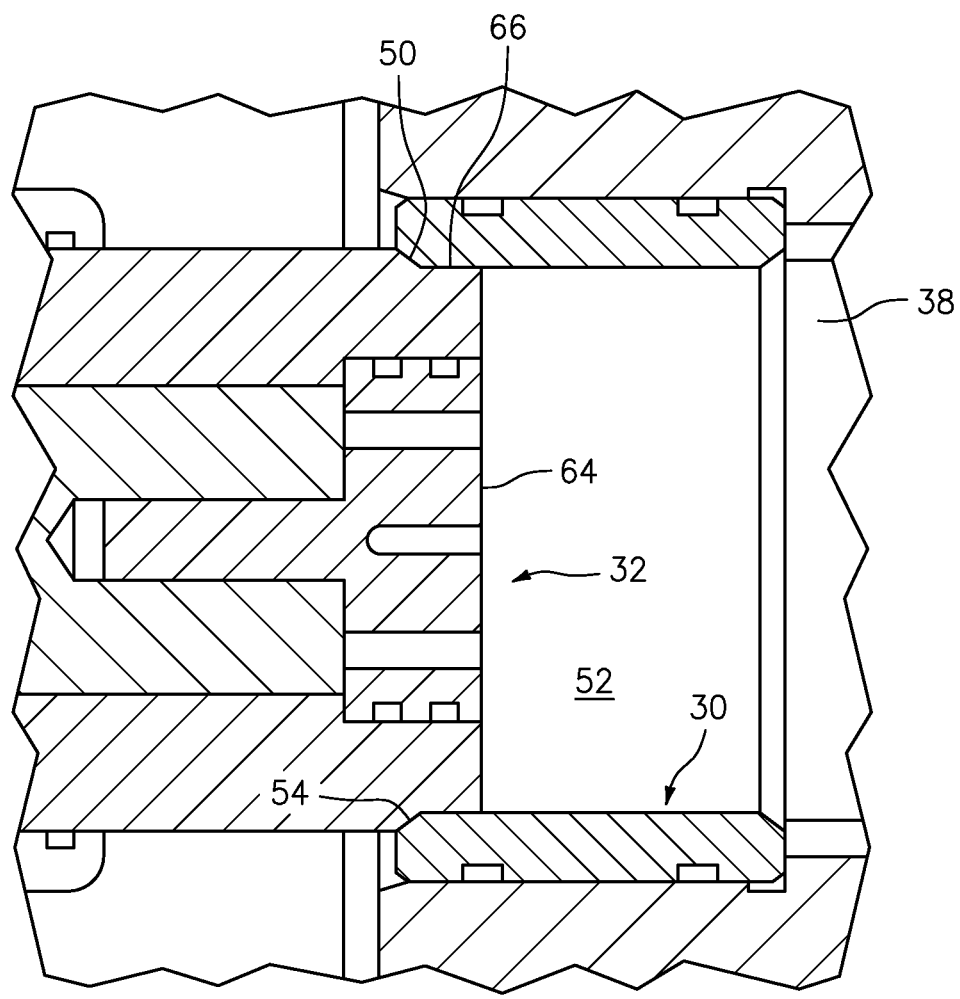
FIG. 7 is an enlarged view of the gate and seat shown in FIG. 4A.

Referring to FIGS. 4A, 4B, and 7, the gate 32 includes a gate shaft 42 and a gate body 44. The gate shaft 42 has a first end 46 and a distal second end 48. The first end 46 of the gate shaft 42 is connected to the output shaft 26 of the worm gear drive 14, and the second end 48 is attached to the gate body 44. The gate body 44 includes a first end 62, an opposite second end 64, and at least one seal surface 50. In the specific gate 32 embodiment shown in FIGS. 4A and 4B, the gate body 44 includes a metering segment 66 extending from the second end 64 to the seal surface 50. The metering segment 66 has a diameter that is less than the seat orifice 52 diameter. The gate 32 is aligned with the seat 30, and typically also aligned with at least a portion of the outlet flow passage 38.

The seat 30 is disposed at an end of the outlet flow passage 38 that is contiguous with the internal chamber 40. The seat 30 includes a central orifice 52 having a diameter and at least one seal surface 54 disposed at a first end of the central orifice 52. In the embodiment shown in FIGS. 4A and 4B, the seat 30 has a cylindrical configuration and is positionally fixed within a bore disposed within the choke body 28.

Figure 8:
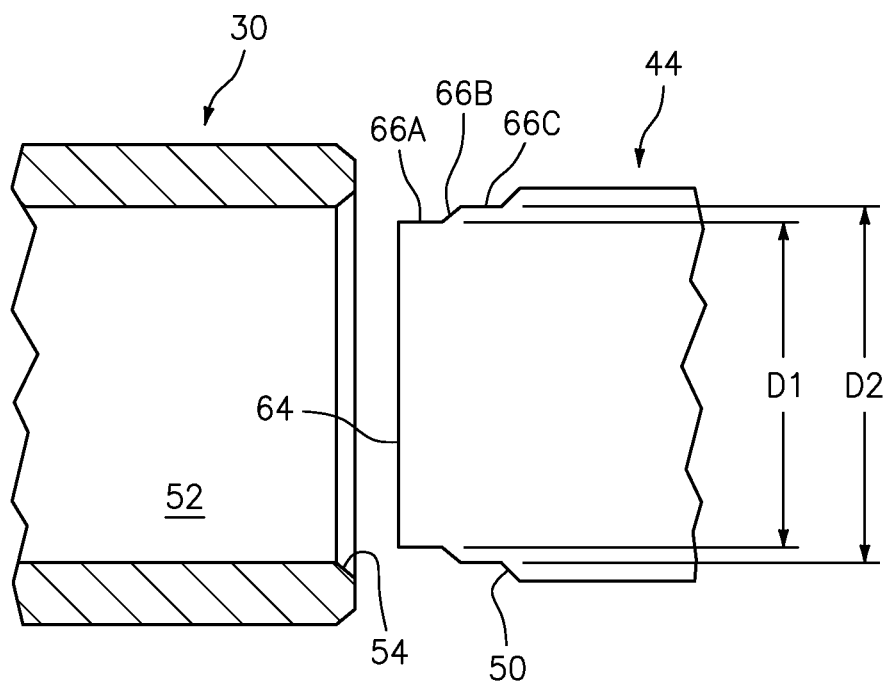
FIG. 8 is diagrammatic view of a gate body embodiment having a plurality of metering segments and a seat.
Figure 8A:
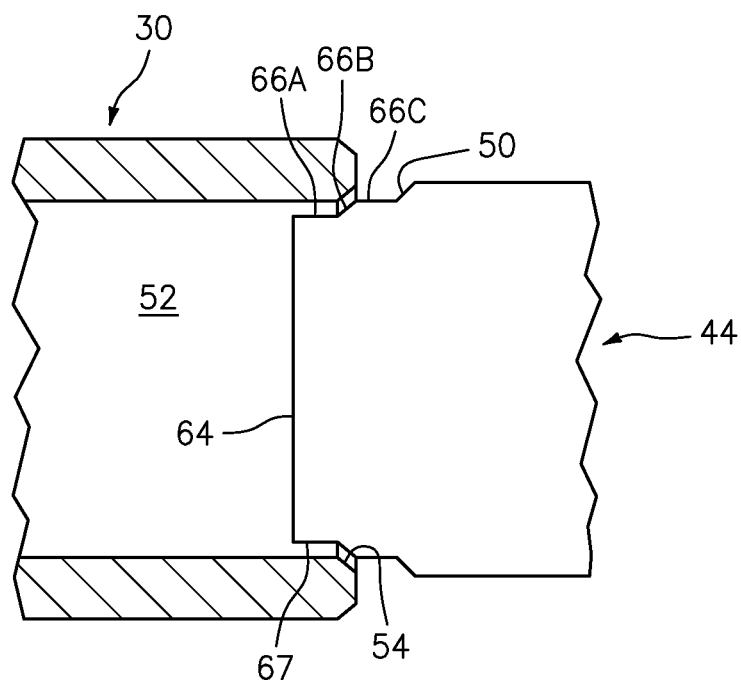
FIGS. 8A-8C are diagrammatic views of the gate body embodiment shown in FIG. 8, with progressively increased engagement of the gate body with the seat.
Figure 8B:
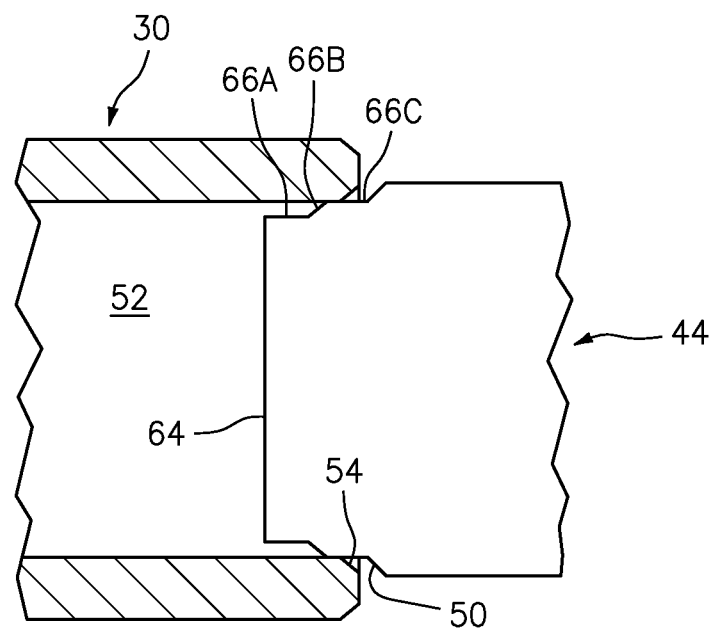
Figure 8C:
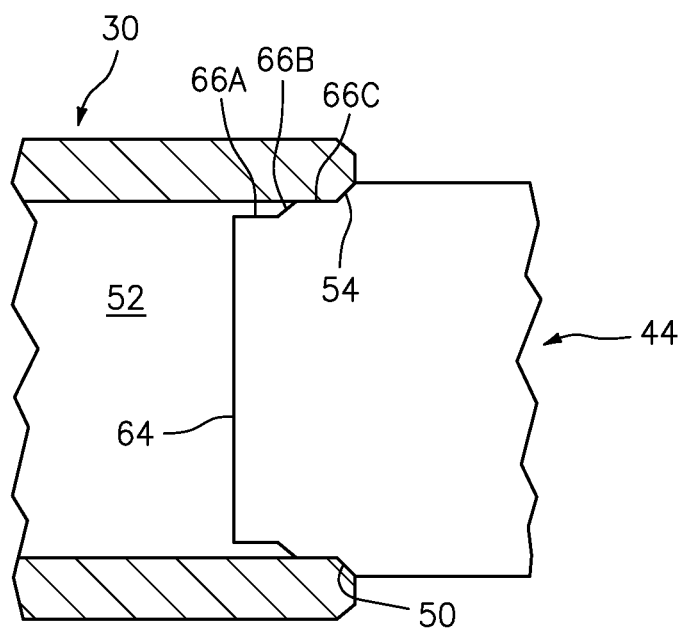

In the gate 32 embodiment shown in FIGS. 4A and 7, the choke valve 12 is shown in a "fully closed" position (described below), wherein the metering segment 66 is received within the seat orifice 52 and the seal surface 50 of the gate body 44 is engaged with the seal surface 54 of the seat 30. FIG. 8 illustrates an alternative gate body configuration that includes a plurality of metering segments 66A, 66B, 66C disposed at the second end of the gate body. Specifically, the gate body 44 embodiment shown in FIG. 8 includes a first metering segment 66A having a first diameter D1, a second metering segment 66B, a third metering segment 66C having a diameter D2, and the seal surface 50. The second metering segment 66B extends between the first and third metering segments 66A, 66C. The gate body 44 embodiment shown in FIG. 8 is a non-limiting example of a gate body 44 having a plurality of metering segments, and the present disclosure is not therefore limited to this particular embodiment; e.g., there may be more than two metering segments, the metering segments may be arcuately shaped and blended together, etc. As will be described below, the plurality of metering segments 66A-66C can be configured to produce a predetermined fluid flow profile and concomitant Cv curve portion for the choke valve 12. FIGS. 8A-8C show the gate body 44 of FIG. 8 (i.e., with a plurality of metering segments 66A-66C) with progressively increased engagement of the gate body 44 with the seat 30. When the gate body 44 and the seat 30 are partially engaged (as shown in FIG. 8), the first metering segment 66A is at least partially received within the seat orifice 52 and an annular passage 67 is formed between the first metering segment 66A and the seat orifice 52. In this partially engaged configuration, the third metering segment 66C is axially disposed outside of the seat orifice 52, the seal surfaces 50, 54 are separated from one another, and an annular passage 67 formed between the first metering segment 66A and the seat orifice 52. The first metering segment 66A (and/or other metering segments) may be configured (e.g., a cylindrical configuration as shown in FIGS. 8A-8C, or a tapered configuration (decreasing diameter), etc.) to change the fluid flow characteristics (including the Cv) as the positions of the gate body 44 and the seat 30 change relative to one another; e.g., further engagement or disengagement.

The nose 34 is positionally fixed within the choke valve body 28, with at least a portion of the nose 34 disposed within the internal chamber 40. The nose 34 includes an internal passage 56 configured to receive at least a portion of the gate body 44.

The gate 32 is linearly translatable between a first position (i.e., a "fully closed" position) where zero fluid flow (0% flow) is permitted between the inlet flow passage 36 and the outlet flow passage 38 (shown in FIG. 4A), and a second position (i.e., a "fully open" position) where a maximum fluid flow (100% flow) is permitted between the inlet flow passage 36 and the outlet flow passage 38 (shown in FIG. 4B), and a continuum of positions there between. In the first position, the at least one seal surface 50 of the gate body is engaged with the seat seal surface 54, thereby prohibiting fluid flow into the seat 30 and the outlet flow passage 38. In the second position, the at least one seal surface 50 of the gate body 44 is disengaged with and spaced apart from the seat 30, thereby permitting fluid flow into the seat 30 and the outlet flow passage 38.

All choke valves have a 100% choke valve open condition (i.e., "fully open"), a 0% choke valve open condition (i.e., "fully closed"), and a continuum of open positions there between; e.g., 70% open, 40% open, 10% open, etc. In any choke position wherein the choke is at least partially open, the fluid flow passing through the choke must pass through a passage area that is a minimum area ("choke minimum passage area"), and that choke minimum passage area is defined by the specific configuration of that particular choke valve. For example, the choke minimum passage area may be defined by factors such as the position of the gate body 44 relative to the seat 30, the configuration of the gate body 44, the configuration of the internal chamber 40 in proximity to the seat 30, etc. Of course, in a fully closed position, the choke minimum passage area is zero. In the prior art choke valves of which we are aware, when the choke valve is in a fully open position the choke minimum passage area is in the range of approximately 15-20% of the orifice area of the choke seat 30. For example, a three inch cylindrical seat 30 has an orifice area: $A=\Pi r^2=\Pi(1.5\text{ in})^2=7.068\text{ in}^2$. Hence, in the prior art choke valves of which we are aware having a three inch seat 30, when the choke valve is in a fully open position, the choke minimum passage area is in the range of about 15-20% of 7.068 in$^2$ (i.e., 1.06 in$^2$-1.41 in$^2$). As can be seen, therefore, the fluid flow through a choke having a three inch seat 30 is affected by the choke minimum passage area more so than the diameter of the seat orifice 52. The choke minimum passage area has a direct effect on the size of debris that can pass through the choke valve and the fluid flow pressure drop across the choke valve. The pressure drop across the choke, in turn affects the Cv curve of the choke valve. A person of skill in the art will recognize that the pressure difference across the choke valve may be a limiting factor in drilling operations, and in particular drilling operations utilizing a MPD system. If the drilling operation contemplates a pressure difference across a choke valve in excess of the capacity of the choke valve, it is often necessary to utilize multiple choke valves. Utilizing multiple choke valves adds cost and complexity to the drilling operation.

Embodiments of the present choke valve 12 provide a solution that permits a greater volumetric flow rate through the choke valve 12 with a relative decrease in pressure difference across the choke valve 12; e.g., for a given flow rate, the pressure difference across the choke valve 12 is less in the present disclosure choke valves 12, than it would be in corresponding prior art choke valves. Embodiments of the present disclosure choke valves 12 include an increased gate stroke relative to prior art choke valves of which we are aware, while at the same time satisfying the requirements of the American Petroleum Institute ("API") 16C specification ("Choke and Kill Equipment") for choke closure time (i.e., the maximum permissible amount of time to go from 100% open to 0% open; e.g., 30 seconds), and/or similar industry standards as applicable. In some present disclosure choke valve 12 embodiments, the gate stroke (i.e., the linear distance travelled between the fully open position and the fully closed position) is in the range of about 1.2x-2.0x, where x is a gate stroke of a conventional choke valve. The increase in gate stroke within the present disclosure choke valve 12 embodiments permits the gate 32 to linearly move further away from the seat 30 and thereby increase the choke minimum passage area. Embodiments of the present choke valve 12 in a fully open position have a choke minimum passage area in the range of up to 100% of the choke seat orifice 52 area, and preferably in the range of approximately 30-60% of the choke seat orifice area, which is significantly greater than is possible with prior art choke valves of which we are aware. Using the cylindrical three inch seat orifice 52 example from above, the choke minimum passage area is in the range of about 2.12 in$^2$-4.24 in$^2$ as compared to the 1.06 in$^2$-1.41 in$^2$ possible with the prior art chokes.

As stated above, the present choke valve 12 embodiments according to the present disclosure include an increased gate stroke length relative to prior art choke valves of which we are aware. In some embodiments, the internal chamber 40 may be enlarged to facilitate the increased stroke length and/or to accommodate the increased volumetric fluid flow rate through the choke valve 12. For example, the dimension of the internal chamber 40 extending parallel to the gate stroke may be increased.

Also as stated above, the present choke valve 12 embodiments according to the present disclosure and the systems for actuating the choke valve 12 are configured to satisfy the requirements of the API 16C specification (and/or similar industry standards as applicable) for choke closure time. The increased gate actuation speed necessary to satisfy the aforesaid standards may be accomplished in several different ways. For example, in some embodiments, a choke valve system 10 according to the present disclosure may be configured to drive the worm gear output shaft 26 at a greater linear velocity; e.g., by operating the worm gear actuation motor 16 at a higher speed, or by utilizing a gear box 22 with a gear ratio that enable the worm gear output shaft 26 at the aforesaid greater linear speed, or by utilizing a worm gear arrangement that provides a higher worm gear output shaft 26 linear velocity, etc. The present disclosure is not limited to any particular mechanism for driving a worm gear output shaft 26 (and therefore an attached gate) at a greater linear velocity.

The ability to accommodate a much higher volumetric flow rate through the choke valve 12 (which choke valve has the same maximum pressure difference capacity as a comparable prior art choke valve) greatly improves the controllability of present choke valve 12 embodiments. Improvements in choke valve 12 controllability are very desirable, particularly for those choke valves used in an MPD system. To illustrate the controllability improvement, consider the Cv curve shown in FIG. 1 which is a non-limiting example of a prior art choke valve with a three inch orifice seat 30. The curve in FIG. 1 includes a first flat portion (between Cv values of about 0-10), a sloped portion between Cv values of about 10-140), a second flat portion (at a Cv value of about 180), and a maximum Cv value of about 180. The controllability of the choke valve 12 is greatest in the sloped portion; e.g., within this sloped portion, changes in "percent open" of the control valve, correspond with greater changes in Cv value, as compared to the relatively flat first and second portions. Hence, if the choke valve system is configured to use a Cv value as a control parameter, control of the choke value in the sloped region facilitates control of the "percent open" of the control valve.

Figure 5:
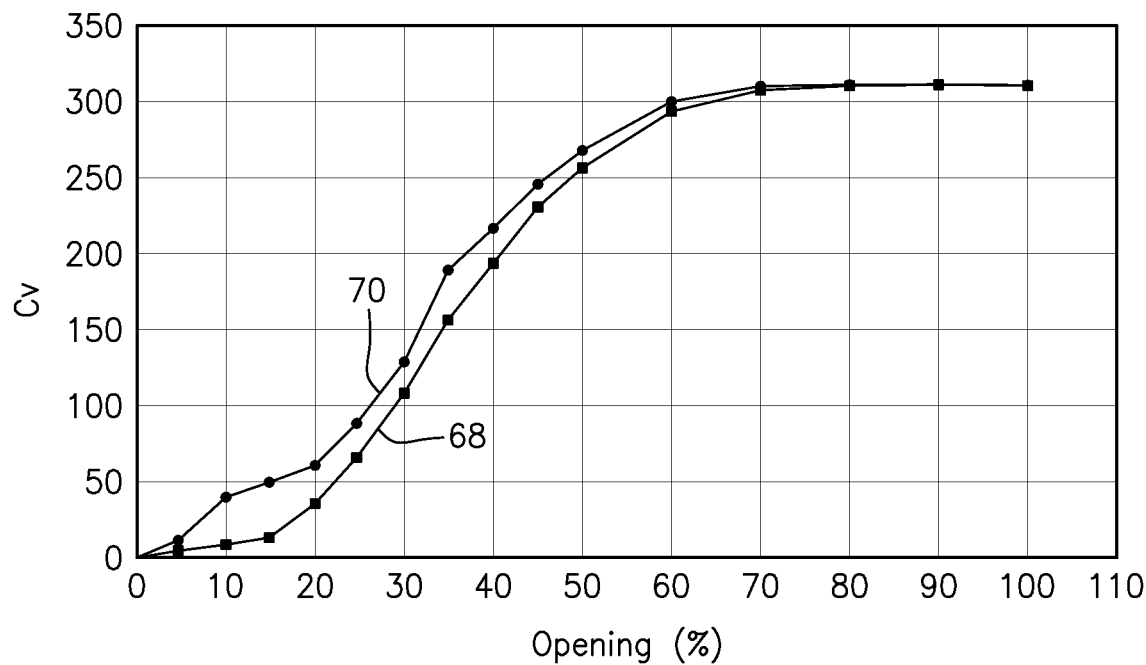
FIG. 5 is an exemplary graph of flow coefficient ("Cv") values versus choke valve open percentage values for an embodiment of a present disclosure three inch choke valve, which data may be referred to as a "Cv curve".

In contrast, consider a choke valve characterized by a flow coefficient (Cv) curve, such as the Cv curves 68, 70 shown in FIG. 5. Each of these Cv curves 68, 70 are defined by data intersection points in a graph (e.g., as shown in FIG. 5) having Cv values along a Y axis and choke open percentage values along an X axis. Both the Cv curves 68, 70 in FIG. 5 characterize a choke valve 12 with a three inch seat orifice similar to that associated with the Cv curve in FIG. 1, except the Cv curves in FIG. 5 are for a choke valve 12 with an increased gate stroke according to the present disclosure. The first Cv curve 68 reflects data associated with a gate body 44 configured like that shown in FIGS. 4A, 4B, and 7; e.g., a gate body 44 having a single metering segment 66. The first Cv curve 68 includes a shallow sloped portion (between Cv values of about 0-15), a more steeply sloped portion between Cv values of about 10-300), a flat portion (at a Cv value of about 310), and a maximum Cv value of about 310. The maximum Cv value (310) for this embodiment of the present disclosure choke valve 12 represents about a 75% increase in the maximum Cv value over the similar sized prior art choke valve. Hence, this present disclosure choke valve 12 embodiment has a Cv sloped portion between the origin of the curve and a Cv value of about 310 (i.e., a first shallow sloped portion, and a second more steeply sloped portion that is about twice the length of that associated with the conventional three inch choke valve), and concomitant substantially improved controllability. The second Cv curve 70 reflects data associated with a gate body 44 configured like that shown in FIG. 8; e.g., a gate body 44 having a plurality of metering segments 66A, 66B, 66C, and wherein the gate body 44 and the seat 30 may be partially engaged and an annular passage 67 formed between the first metering segment 66A and the seat orifice 52. The second Cv curve 70 is similar to the first Cv curve 68 except in the about 0-20% open portion, the second Cv curve 70 has a slope greater than the shallow slope portion of curve 68, having Cv values from zero to about 60. Hence, the control valve 12 embodiment having a gate body 44 with a plurality of metering segments provides increased controllability as the choke valve 12 approaches the fully closed position. As stated above, the present disclosure is not limited to any particular gate body 44 configuration; e.g., the plurality of metering segments portion of the gate body 44 can be configured to produce a particular fluid flow profile and concomitant Cv curve portion for that suits a given choke valve 12 application. All of the present disclosure choke valve 12 embodiments provide an increase in controllability that improves the ability of the choke valve 12 to be used as a tool in regulating downhole casing pressures, as is done in MPD systems.

Figure 6:
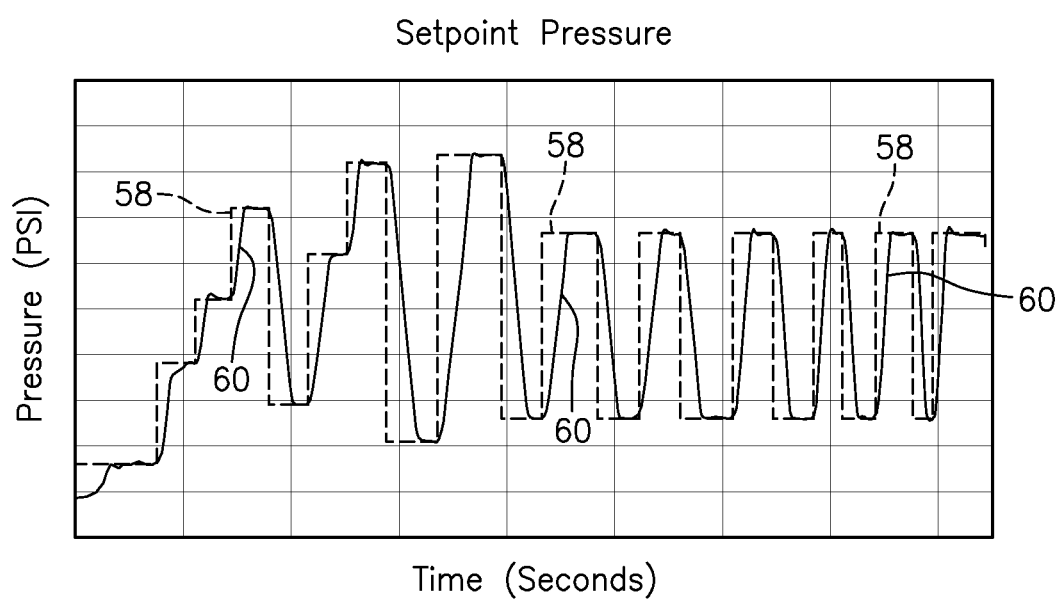
FIG. 6 is a graph of casing pressure values versus time values for an exemplary present disclosure choke valve.

The graph shown in FIG. 6, depicting downhole well pressure (Y-axis) versus time (X-axis), illustrates well the improved controllability of the present disclosure choke valves 12. As can be seen from the graph, the set point pressure data line 58 appears in a step function like manner. The casing pressure data line 60 illustrates the response time of the system 10 utilizing a present disclosure choke valve 12. The prompt and continuous agreement between set point pressure data line 58 and casing pressure data line 60 illustrates minimal pressure teetering to arrive at the casing set point pressure. Hence, the data depicted in FIG. 6 illustrates the desirability of a present disclosure choke valve 12 in drilling applications such as MPD.

The controllability and the ability of the present disclosure choke valves 12 to handle larger fluid flow rates makes them a desirable tool in high volume flow rate and low pressure applications. Some embodiments of the present disclosure choke valves 12 may be configured to utilize different trim sets; e.g. a first trim set having a two inch orifice seat 30 and mating gate 32, a second trim set having a three inch orifice seat 30 and mating gate 32, a third trim set having a four inch orifice seat 30 and mating gate 32, etc. The ability to utilize multiple trim sets, and the increased fluid flow rate capacity of the choke valve 12 with any of the trim sets, increases their utility in the drilling process. The increased gate stroke relative to prior art choke valves also provides a greater amount of debris clearance relative to prior art choke valves of which we are aware. The present disclosure choke valves are, therefore, less susceptible to clogging relative to prior art choke valves.

The detailed description of various embodiments herein makes reference to the accompanying drawings, which show various embodiments by way of illustration. While these various embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A choke valve, comprising:
   a body having an internal chamber, an inlet flow passage that extends between an exterior of the body and the internal chamber, and an outlet flow passage that extends between the exterior of the body and the internal chamber;
   a seat having a seat orifice with an area, the seat positioned at an end of the outlet flow passage contiguous with the internal chamber;
   a gate having a gate shaft and a gate body affixed to one end of the gate shaft, wherein the gate body includes:

a first metering segment having a constant first diameter extending a first axial length along a translation axis, a second metering segment extending between the first metering segment and a third metering segment, the second metering segment having a second axial length, the third metering segment extending between the second metering segment and a first seal surface, the third metering segment having a constant second diameter extending a third axial length, wherein the second diameter is larger than the first diameter, and the first seal surface extending from the third metering segment, wherein portions of the first seal surface have a diameter larger than the second diameter;

wherein the gate is linearly translatable within the body between a fully open position and a fully closed position, wherein in the fully closed position the first seal surface of the gate body is engaged with the seat orifice; and wherein in the fully open position a choke minimum passage area is defined between the gate body and the seat orifice.

2. The choke valve of claim 1, wherein in the fully open position, the choke minimum passage area is at least 60% of the seat orifice area.

3. The choke valve of claim 1, wherein in the fully open position, the choke minimum passage area is 100% of the seat orifice area.

4. The choke valve of claim 1, wherein the seat orifice has an inner diameter; and wherein the first diameter of the first metering segment is less than the inner diameter of the seat orifice, and the first metering segment is configured to be received within the seat orifice when the gate body is engaged with the seat orifice.

5. The choke valve of claim 4, wherein the first seal surface is disposed adjacent the third metering segment; and wherein the seat includes a second seal surface disposed at an axial end of the seat orifice; and wherein the first seal surface and the second seal surface are configured to engage with one another when the gate is in the fully closed position, and to substantially prevent the passage of liquid into or out of the seat orifice.

6. The choke valve of claim 5, wherein the gate body includes a first axial end and an opposite second axial end, and the gate shaft extends outwardly from the first axial end and the first, second and third metering segments extends successively between the second axial end and the first seal surface, and the first seal surface is disposed between the first axial end and the second axial end.

7. The choke valve of claim 1, wherein the seat orifice has an inner diameter; and the second diameter of the third metering segment is less than the inner diameter of the seat orifice, and the first metering segment and the third metering segment are configured to be received within the seat orifice when the gate body is engaged with the seat orifice.

8. The choke valve of claim 7, wherein the gate body includes a first seal surface disposed adjacent the third metering segment; and wherein the seat includes a second seal surface disposed at a first end of the seat orifice; and wherein the first seal surface and the second seal surface are configured to engage with one another when the gate is in the fully closed position, and to substantially prevent the passage of liquid into or out of the seat orifice.

9. The choke valve of claim 8, wherein the gate body includes a first axial end and an opposite second axial end, and the gate shaft extends outwardly from the first axial end and the first metering segment extends axially between the second axial end and the second metering segment, and the third metering segment extends axially between the second metering segment and the first seal surface, and the first seal surface is disposed between the first axial end and the first metering segment.

10. The choke valve of claim 1, wherein the choke valve is characterized by a flow coefficient (Cv) curve, the Cv curve defined by data intersection points in a graph having Cv values along a Y axis and choke open percentage values along an X axis, and the Cv curve is sloped from an origin of the Cv curve to at least a sixty percent choke open value wherein the origin of the Cv curve is disposed at the data intersection point where both the Cv value and the choke open value are equal to zero; and wherein the Cv curve is sloped for a particular data intersection point when the Cv value increases from a first Cv value at a first adjacent data intersection point to a second Cv value at a second adjacent data intersection point, wherein the first adjacent data intersection point has a choke open value smaller than that of the particular data intersection point and the second adjacent data intersection point has a choke open value greater than that of the particular data intersection point.

11. The choke valve of claim 9, wherein the gate body and the seat are positionable in a partially engaged configuration wherein the first metering segment is at least partially received within the seat orifice, the third metering segment is axially disposed outside of the seat orifice, the first seal surface and the second seal surface are separated from one another, and an annular passage is formed between the first metering segment and the seat orifice.

12. A choke valve system, comprising:

a choke valve having:

a body having an internal chamber, an inlet flow passage that extends between an exterior of the body and the internal chamber, and an outlet flow passage that extends between the exterior of the body and the internal chamber;

a seat having a seat orifice with an area, the seat positioned at an end of the outlet flow passage contiguous with the internal chamber;

a gate having a gate shaft and a gate body affixed to one end of the gate shaft, wherein the gate body includes:

a first metering segment having a constant first diameter extending a first axial length along a translation axis, a second metering segment extending between the first metering segment and a third metering segment, the second metering segment having a second axial length, the third metering segment extending between the second metering segment and a first seal surface, the third metering segment having a constant second diameter extending a third axial length, wherein the second diameter is larger than the first diameter, and the first seal surface extending from the third metering segment, wherein portions of the first seal surface have a diameter larger than the second diameter;

wherein the gate is linearly translatable within the body between a fully open position and a fully closed position, wherein in the fully closed position the first seal surface of the gate body is engaged with the seat orifice; and wherein in the fully open position a choke minimum passage area is defined between the gate body and the seat orifice;

a worm gear drive having an input shaft and an output shaft, wherein the output shaft is connected to the gate shaft; and a motor configured to selectively drive the worm gear input shaft, and thereby cause linear translation of the gate shaft; and wherein the system is configured such that the choke valve may be driven from the fully closed position to the fully open position.

13. The system of claim 12, wherein the seat orifice has an inner diameter and a second seal surface disposed at an axial end of the seat orifice; and the first diameter of the first metering segment is less than the inner diameter of the seat orifice, and the first metering segment is configured to be received within the seat orifice when the gate body is engaged with the seat orifice; and the first seal surface and the second seal surface are configured to engage with one another when the gate is in the fully closed position, and to substantially prevent the passage of liquid into or out of the seat orifice.

14. The system of claim 12, wherein the seat orifice has an inner diameter; and the second diameter of the third metering segment is less than the inner diameter of the seat orifice, and the first metering segment and the third metering segment are configured to be received within the seat orifice when the gate body is engaged with the seat orifice.

15. The system of claim 14, wherein the gate body includes a first seal surface disposed adjacent the third metering segment; and wherein the seat includes a second seal surface disposed at a first end of the seat orifice; and wherein the first seal surface and the second seal surface are configured to engage with one another when the gate is in the fully closed position, and to substantially prevent the passage of liquid into or out of the seat orifice.

16. The system of claim 15, wherein the gate body includes a first axial end and an opposite second axial end, and the gate shaft extends outwardly from the first axial end and the first metering segment extends axially between the second axial end and the second metering segment, and the third metering segment extends axially between the second metering segment and the first seal surface, and the first seal surface is disposed between the first axial end and the first metering segment; and wherein the gate body and the seat are positionable in a partially engaged configuration wherein the first metering segment is at least partially received within the seat orifice, the third metering segment is axially disposed outside of the seat orifice, the first seal surface and the second seal surface are separated from one another, and an annular passage is formed between the first metering segment and the seat orifice.

17. The system of claim 12, wherein the choke valve is characterized by a flow coefficient (Cv) curve, the Cv curve defined by data intersection points in a graph having Cv values along a Y axis and choke open percentage values along an X axis, and the Cv curve is sloped from an origin of the Cv curve to at least a sixty percent choke open value, wherein the origin of the Cv curve is disposed at the data intersection point where both the Cv value and the choke open value are equal to zero; and wherein the Cv curve is sloped for a particular data intersection point when the Cv value increases from a first Cv value at a first adjacent data intersection point to a second Cv value at a second adjacent data intersection point, wherein the first adjacent data intersection point has a choke open value smaller than that of the particular data intersection point and the second adjacent data intersection point has a choke open value greater than that of the particular data intersection point.

* * * * *